No. 643,630. Patented Feb. 20, 1900.
J. V. BUSH.
TRACTION WHEEL FOR VEHICLES.
(Application filed Nov. 4, 1899.)
(No Model.)
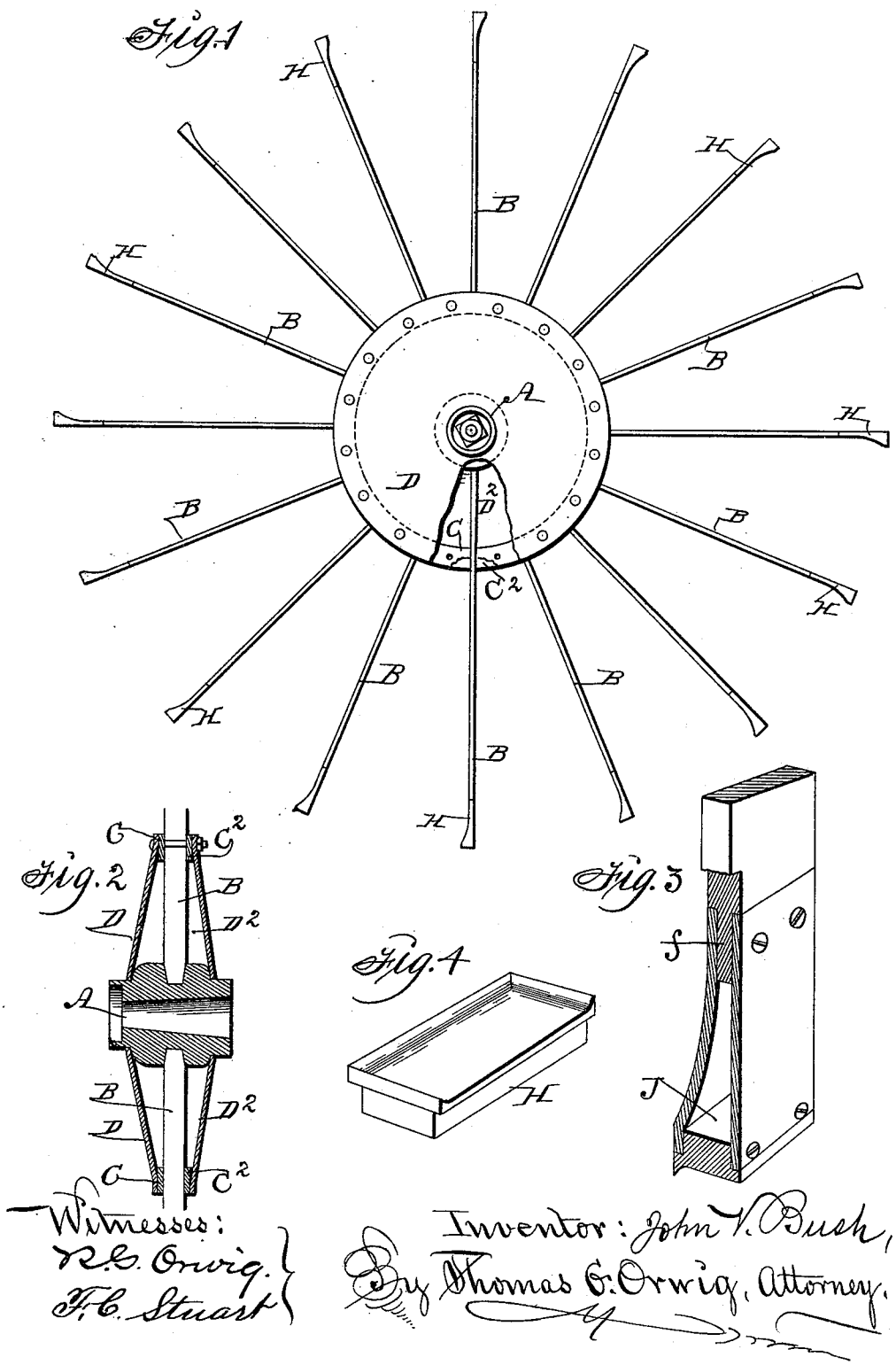
Witnesses:
R. C. Orwig.
F. C. Stuart.
Inventor: John V. Bush,
By Thomas C. Orwig, Attorney.
THE NORRIS PETERS CO., PHOTO-LITHO., WASHINGTON, D. C.

UNITED STATES PATENT OFFICE.

JOHN V. BUSH, OF COLESBURG, IOWA.

TRACTION-WHEEL FOR VEHICLES.

SPECIFICATION forming part of Letters Patent No. 643,630, dated February 20, 1900.

Application filed November 4, 1899. Serial No. 735,763. (No model.)

*To all whom it may concern:*

Be it known that I, JOHN V. BUSH, a citizen of the United States, residing at Colesburg, in the county of Delaware and State of Iowa, have invented a new and useful Traction-Wheel for Vehicles, of which the following is a specification.

The object of my invention is to prevent the slipping of the traction-wheels of vehicles when they tread upon the ground as required in advancing the vehicle; and my invention consists in a wheel specially adapted for automobile carriages, and constructed as hereinafter set forth, pointed out in my claims, and illustrated in the accompanying drawings, in which—

Figure 1 is a side view of the wheel, showing a part of one of the disks fitted to the hub and to the spokes at some distance from the hub broken away. Fig. 2 is an enlarged sectional view of the hub, showing how the disks and spokes are jointly fixed to the hub in such a manner that a broken or damaged spoke can be readily removed and replaced by a new one while all the other spokes and the disks remain in place. Fig. 3 is a perspective view showing the construction of a foot detachably fixed to a spoke and an edge portion of the spoke and foot broken away to show a calk that is detachably connected with the foot. Fig. 4 is a perspective view of a calk in an inverted position adapted to be connected with the foot on the end of a spoke for the purpose of preventing the feet and wheel from slipping when traveling.

The letter A designates a metal hub of common form that has a plurality of mortises for admitting the ends of spokes.

Spokes B, made of spring-steel of quadrilateral shape in cross-section, as shown in Fig. 3, are fitted in the mortises to extend radially from the hub.

Metal rings C and $C^2$ and metal disks D and $D^2$, having central openings, are fitted to the ends of the hub and also to the rings C and $C^2$ to overlie the rings, so that the disks and rings and spokes can be jointly clamped together by means of bolts in such a manner that the spokes will be retained securely in the hub and also in such a manner that the disks will brace the spokes as required to prevent lateral movements thereof relative to the hub. The disks also serve as guards to prevent mud from adhering to the hub.

On the end of each spoke is a tenon $f$, that enters the top end of a hollow metal footpiece H, fitted and detachably fixed thereto by means of screws and the toe portion projecting forward and at right angles to the axis of the wheel. The rear face and heel portion of the footpiece is flat and extends in the plane of the spoke, and its front face is curved outward, and the toe portion is consequently projected forward, and in the open bottom of the foot is fitted a steel calk J and detachably fastened therein by means of screws, as shown in Fig. 3.

It is obvious the size of a hub and the weight and length of the spokes and footpieces may vary as required to produce wheels of various sizes and for different kinds of vehicles adapted for carrying different objects and weights. It is also obvious that any one of the plurality of calks, footpieces, and spokes that are detachably fastened may be readily removed whenever impaired and new ones put in their places.

In the practical use of my invention the footpieces carrying the calks will successively come in contact with the surface over which the wheels of a vehicle are advanced, and the heel portion of each footpiece will first engage the ground and in some degree relax its hold as the toe portion takes hold by means of the sharp edge of the calk, as required to prevent any such slipping of the wheel as often occurs when the continuous surface of the tire on a wheel contacts with the ground. Mud that may adhere to the footpieces will be comparatively small in amount to what adheres to the continuous rim of a wheel when advanced over adhesive ground, and the small quantity liable to adhere to each footpiece will readily drop off immediately after the footpiece rises from the level of the ground over which the wheel is advanced.

The flexibility of the spokes will allow each one to yield sufficiently to produce such elasticity in the wheel as will prevent the jarring and concussion incident to wheels having continuous rims and tires.

Having thus described the construction, function, and purpose of each part of the wheel and the operation thereof, its utility will be readily understood by persons familiar with the art to which it pertains, and what I therefore claim as new, and desire to secure by Letters Patent therefor, is—

1. In a traction-wheel, a flexible spoke having a detachable rigid footpiece and the toe portion projecting forward at right angles to the axis of the wheel for the purposes stated.

2. In a traction-wheel, a footpiece on the end of a spoke and the toe portion of the foot projecting in a plane at right angles to the axis of the hub of the wheel, and a calk fixed to the bottom of the footpiece for the purposes stated.

3. In a traction-wheel, a hub having mortises for spokes, flexible spokes fitted in the mortises and rings fixed to the end portions of the hub to incline toward each other and also fixed to the spokes at some distance from the hub, in the manner set forth for the purposes stated.

4. In a traction-wheel, a hub having mortises for spokes, flexible spokes adapted to bend backward and forward in a plane at right angles to the axis of the hub fitted in the mortises, a ring fixed to the spokes at some distance from the hub and a disk fitted on the hub and fixed to the ring and spokes for the purposes stated.

5. In a traction-wheel, a hollow footpiece, straight and flat on its rear side and inclined forward on its front and a calk detachably fixed in the bottom, in combination with the free end of a spoke, for the purposes stated.

6. A traction-wheel for vehicles comprising a hub having mortises for spokes, flexible spokes fitted in the mortises and adapted to bend in the plane of the axis of the hub, rings fixed to the spokes at some distance from the hub, disks fitted to the end portions of the hub and fixed to the rings and spokes, footpieces fixed to the ends of the spokes and calks fixed in the bottoms of the footpieces, all arranged and combined to operate in the manner set forth for the purposes stated.

JOHN V. BUSH.

Witnesses:
 JOHN A. BUSH,
 W. E. LOCKRIDGE.